United States Patent [19]
Shiga

[11] Patent Number: 5,710,773
[45] Date of Patent: Jan. 20, 1998

[54] PACKET TRANSMISSION SYSTEM

[75] Inventor: Tomohisa Shiga, Tokyo, Japan

[73] Assignee: Sony Corporation, Tokyo, Japan

[21] Appl. No.: 502,772

[22] Filed: Jul. 14, 1995

[30] Foreign Application Priority Data

Jul. 25, 1994 [JP] Japan ................................. 6-192807
Sep. 9, 1994 [JP] Japan ................................. 6-242255

[51] Int. Cl.⁶ ............................................. H04L 7/04
[52] U.S. Cl. ............................... 370/512; 375/362
[58] Field of Search ..................... 370/77, 79, 84, 370/91, 92, 94.1, 100.1, 94.2, 60, 503, 508, 509, 510, 512, 471, 473, 474; 375/354, 362, 370, 371, 356

[56] References Cited

U.S. PATENT DOCUMENTS

| | | | |
|---|---|---|---|
| 5,051,990 | 9/1991 | Kato | 370/105.3 |
| 5,062,107 | 10/1991 | Heiss et al. | 370/105 |
| 5,526,353 | 6/1996 | Henley et al. | 370/60.1 |
| 5,535,216 | 7/1996 | Goldman et al. | 370/100.1 |
| 5,535,251 | 7/1996 | Sugawara | 375/356 |

OTHER PUBLICATIONS

IEEE Standards Draft, "Annex C. Cable Operation and Implementation Examples (informative)", In *High Performance Serial Bus*, P1394/Draft 6.4v0, Oct. 14, 1993, (IEEE).

*Primary Examiner*—Hassan Kizou
*Assistant Examiner*—Kwang Bin Yao
*Attorney, Agent, or Firm*—Jay H. Maioli

[57] ABSTRACT

In a packet transmission system for transmitting a bit stream of a prescribed rate while also packeting the bit stream, a transmission side is provided with a unit for periodically providing the packeted bit stream with the position information of the head bits thereof and a circuit for adding each packet with the time of the supplied head bit position, and a reception side is provided with a temporary storage memory for temporarily storing the received packet, a data extractor for extracting the time of the head bit position which is added to the received packet, and a read-out controller for controlling the rate of a read-out operation of the bit stream from the temporary storage memory using the extracted time.

10 Claims, 10 Drawing Sheets

—— P1394 SERIAL BUS

FIG. 11

CSP : CYCLE START PACKET
Iso : SYNCHRONOUS TYPE DATA PACKET
Async : ASYNCHRONOUS TYPE DATA PACKET

1

PACKET TRANSMISSION SYSTEM

BACKGROUND OF THE INVENTION

1. Field of the Invention

The present invention relates to a packet transmission system used to transmit a constant-rate bit stream while packeting the bit stream using a communication control bus which is in conformity with IEEE-P1394 (hereinafter referred to "P1394 serial bus". The serial bus as described above is disclosed in detail as "specification of IEEE P1394 serial bus" (issued on Oct. 14, 1993).

2. Description of the Related Art

In a conventional packet transmission system, when a bit stream is transmitted from a transmission side to a reception side during packeting, at the transmission side a header is provided at the head of the bit stream which is packeted in a predetermined format, and at the reception side the position of the header of the packet is detected in order to allow synchronization with the transmission side with the position information of the header.

In this conventional method, however, means for detecting the position of the header must be changed every time the format of the bit stream is varied, and thus there is a problem that it is dependent on an application.

SUMMARY OF THE INVENTION

An object of the present invention is to provide a packet transmission system which is capable of matching the rate of a bit stream between a reception side and a transmission side without being dependent on any application when a bit stream of any rate and any format is transmitted.

Another object of the present invention is to provide a packet transmission system which is capable of matching the rate of a bit stream between the reception side and the transmission side, and controlling a phase relationship therebetween to a constant one.

A further object of the present invention is to provide a packet transmission system which is capable of detecting a data loss amount during a transmission operation.

The applicant of this application has filed the following applications as applications which are relevant to this application:

1. European Laid-open Patent Application No. 0614297
2. Japanese Patent Application No. Hei-5-126682
3. Japanese Patent Application No. Hei-5-200055
4. Japanese Patent Application No. Hei-6-51246
5. Japanese Patent Application No. Hei-6-134940
6. Japanese Patent Application No. Hei-6-165883

The corresponding U.S. Patent Applications to the above six applications are now pending.

In order to attain the above objectives, according to one aspect of the present invention, a packet transmission system for transmitting a bit stream of a prescribed rate while also packeting the bit stream is characterized in that a transmission side is provided with a means for periodically supplying the packeted bit stream with the position information of the head bits thereof (hereinafter referred to as "head bit position") and a means for adding each packet with the time of the supplied head bit position, and a reception side is provided with a temporarily-storing means for temporarily storing the received packet, a means for extracting the time of the head bit position which is added to the received packet, and a means for controlling the rate of a read-out operation of the bit stream from the temporarily-storing means using the extracted time.

In the packet transmission system as described above, the means for supplying the head bit position comprises a counter which operates at the same rate as the bit stream. The position of the bit stream at a time obtained by adding a predetermined value to the time of the head bit position extracted from the received packet is set to the position of the head bit of the bit stream at the reception side, and the read-out rate of the bit stream at the reception side is controlled on the basis of the interval of the head bit position.

According to another aspect of the present invention, a packet transmission system for transmitting a bit stream of a prescribed rate while packeting the bit stream is characterized in that a transmission side is provided with a means for adding the bit position of the bit stream to each packet every prescribed time, and in that a reception side is provided with a means for setting the position of the head bit at the reception side on the basis of the bit position of the bit stream which is added at the transmission side, and then transmitting it to a temporarily-storing means, and in that a means for controlling the read-out rate of the bit stream from the temporarily-storing means is accomplished on the basis of the time when the head bit position at the reception side is read out from the temporarily-storing means and the time of the head bit position extracted from the packet.

In the packet transmission system as described above, the packet length at the transmission side is added to the packet, and the data loss amount during transmission operation is detected using the packet length at the reception side and the bit position of the bit stream.

Furthermore, in the packet transmission system as described above, the time at the transmission side is matched to the time at the reception side.

According to the present invention, at the reception side, the time of the head bit position of the bit stream which is added to the packet at the transmission side is extracted, and the read-out rate of the bit stream from the temporarily-storing means at the reception side is controlled on the basis of the extracted time. Therefore, the rate of the bit stream can be matched between the transmission side and the reception side.

The read-out rate of the bit stream at the reception side is controlled so that position of the bit stream at the time obtained by adding the predetermined value to the time of the head bit position extracted from the received packet is set to the position of the head bit of the bit stream at the reception side, and the difference between the intervals of the head bit position is set equal to zero.

The head bit position at the reception side is set on the basis of the bit position of the bit stream added at the transmission side, and the read-out rate of the bit stream at the reception side is controlled on the basis of the time when the head bit position is read out from the temporarily-storing means and the time of the head bit position extracted from the packet. With this operation, the rate of the bit stream can be matched between the transmission side and the reception side, and the phase relationship therebetween can be kept fixed.

According to the present invention, when a bit stream of any rate and any format is transmitted, the rate of the bit stream at the transmission side and the rate of the bit stream at the reception side can be matched to each other without being dependent on any application.

Furthermore, according to the present invention, the rate of the bit stream at the transmission side and the rate of the bit stream at the reception side are matched to each other, and the phase relationship therebetween can be kept fixed. In addition, according to the present invention, the data loss amount during the data transmission operation can be detected.

DETAILED DESCRIPTION OF THE PREFERRED EMBODIMENTS

The present invention will be described in detail in the following order:

(1) Communication System Using P1394 Serial Bus (2) First Embodiment of Present Invention (3) Second Embodiment of Present Invention 1) Communication System Using P1394 Serial Bus Two embodiments to transmit a bit stream of 4 Mbps on a P1394 serial bus will be described. First, a communication system using the P1394 serial bus which is commonly used for the two embodiments will be described.

Figure 10:
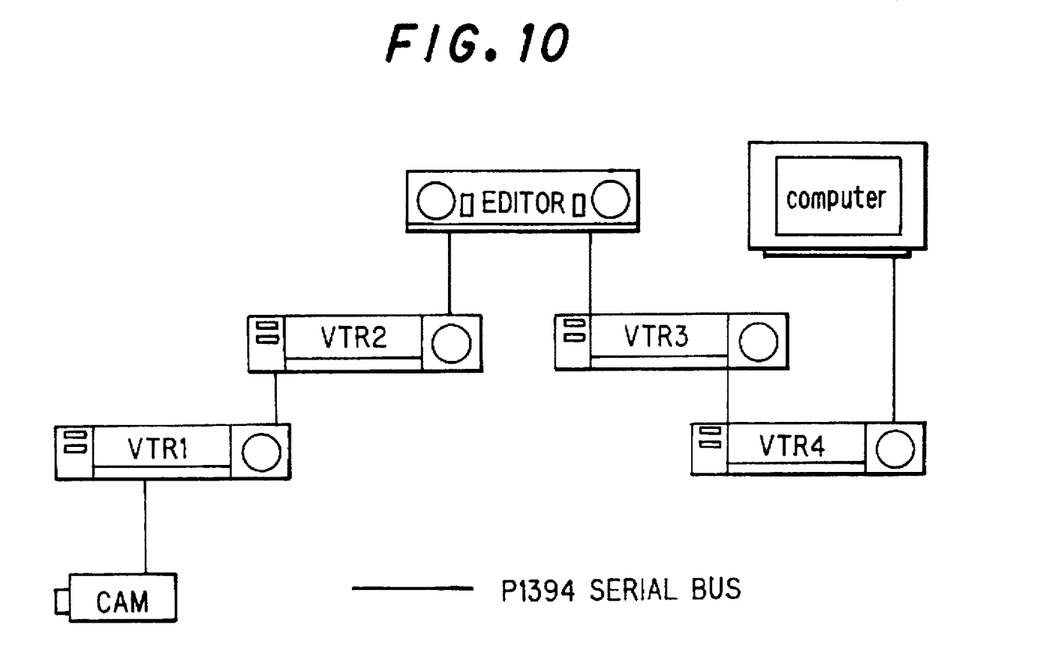
FIG. 10 is a diagram showing a communication system using a P1394 serial bus.

FIG. 10 shows such a communication system. The communication system includes four digital video tape recorders (VTR 1 to 4), a digital cam coder (CAM), an editor and a computer. These pieces of equipment are connected to one another through a cable of the P1394 serial bus. Each piece of equipment has a function of relaying information signals and control signals which are output through the capability of the P1394 serial bus, so that the communication system is equivalent to a communication system in which the respective pieces of equipment are connected to the common P1394 serial bus.

Figure 11:
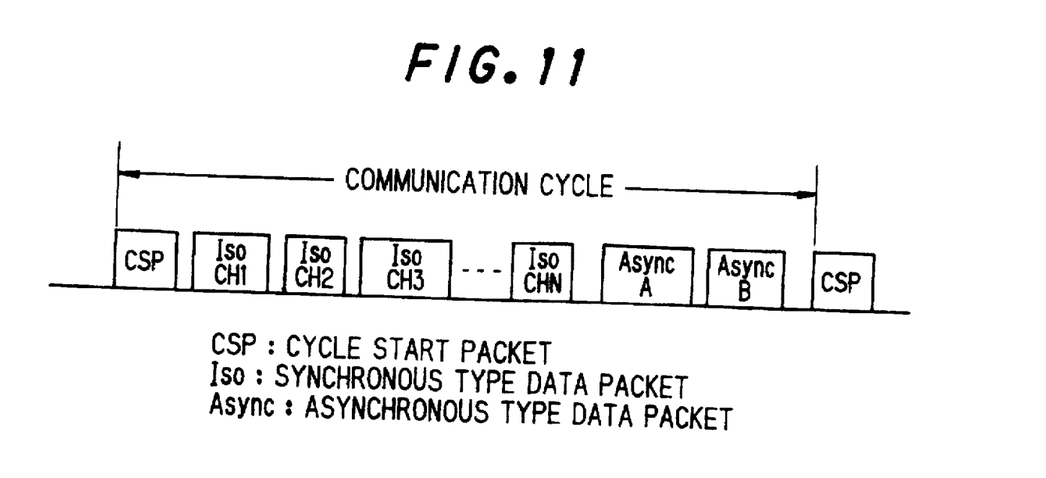
FIG. 11 is a diagram showing a communication cycle of the P1394 serial bus.

The data transmission of the equipments having the common bus is performed in a time-division multiplex mode every predetermined communication cycle (for example, 125 μsec) as shown in FIG. 11. The management of the communication cycle on the bus is performed by a prescribed equipment which is called a "cycle master", and the cycle master transmits a synchronizing packet representing a start time of the communication cycle to another equipment on the bus to start the data transmission in the communication cycle. When the respective equipments are connected to one another through the P1394 serial bus to constitute the communication system, the cycle master is automatically determined by a means which is defined in IEEE-P1394.

There are two types of data, isochronous data such as video data, audio data, etc. and asynchronous data such as connection control command, etc. as a data transmission mode during one communication cycle. An isochronous data packet is transmitted before an asynchronous data packet. Plural isochronous data packets can be discriminated from one another by affixing the respective isochronous data packets with channel numbers 1, 2, 3, . . . , N respectively. A period from the end of the transmission of the isochronous data packets of all channels to be transmitted until a next cycle start packet is used for the transmission of the asynchronous data packets.

2) First Embodiment 2-1) Timing at Transmission side

Figure 1:
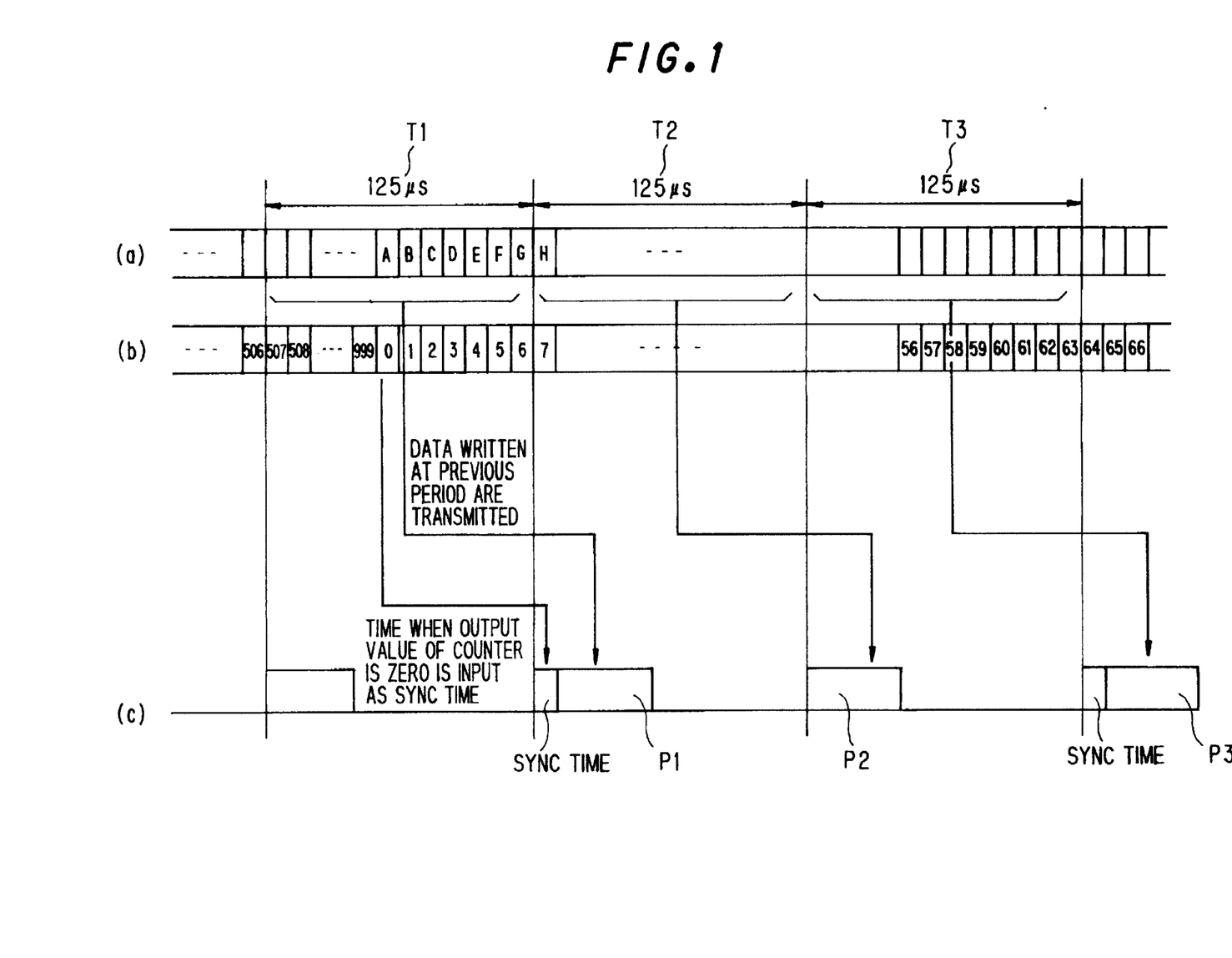
FIG. 1 is a timing chart for signals at a transmission side in a first embodiment of the present invention.

The timing of the transmission side in the first embodiment will first be described with reference to FIG. 1. In FIG. 1, (a) represents an input bit stream, (b) represents the output value of a counter for counting clocks of 4 MHz, and (c) represents a transmitted isochronous data packet. The packet which is the transmission target in the present invention is limited to the isochronous data packet, and thus it is hereunder referred to as the "packet".

As defined in the specification of IEEE-P1394, the input bit stream is transmitted while packeted every 125 μs. In this case, a bit stream which is written into FIFO as described later during a period T1 is transmitted as a packet P1, and a bit stream which is written into FIFO during a period T2 is transmitted as a packet P2.

In this embodiment, the input bit stream is assumed to be an assembly of bit arrays which is repeated at a constant period, that is, a bit stream which actually has no constant period or is repeated at another period is regarded as an assembly of bit arrays which is repeated at a constant period, and it is virtually subjected to a framing operation. The framing operation is performed using a counter which operates at the same rate as the input bit rate. The output value of the counter is shown in (b) of FIG. 1.

There are two types of packets. One type of packet is supplied with a synchronizing time (Sync Time) at the head thereof, and the other type of packet is supplied with no sync time at the head thereof. This is dependent on whether the head bit of a bit stream is contained in the bit stream which is transmitted in the packet. In this embodiment, the position at which the counter value is equal to zero is set as the head.

The sync time is defined as a time which a cycle timer of P1394 indicates at the head bit of the frame. A cycle timer is provided in each piece of equipment, and it has a time which cycles for a prescribed period (for example, 128 seconds).

The clocks at the transmission side and the reception side are independent of each other, and thus are not synchronized with each other. Therefore, a clock error accumulates and consequently the write-in rate of the bit stream into the FIFO at the transmission side and the read-out rate of the bit stream from the FIFO gradually deviate from each other. The sync time is used as information to adjust this deviation. The details of this adjusting method will be described later.

In the transmission system of this embodiment, the head bit cannot be determined by analyzing the content of the bit stream because this system is not dependent on any application. Accordingly, a counter increments by one at the same rate as the bit stream is prepared, and the position at which the output value of the counter is equal to zero is set as the head bit. The period of the counter must be set longer than 125μ which is equal to one period of the P1394 because two or more sync times cannot be written into one packet. In this embodiment a counter having one period length of 250 μs is used, for example, a counter which makes one round when counting a clock of 4 MHz at 1000 times.

Since the output value of the counter is equal to zero during the period T1 of FIG. 1, a sync time is provided to the packet P1. Likewise, a sync time is provided to the packet P3 because the output value of the counter is equal to zero during the period T3. However, as the counter value is not equal to zero during the period T2, no sync time is provided to the packet P2. In FIG. 1, the values of the bit stream from the time when the output value of the counter is equal to zero are assumed to be A, B, C, . . . . These values will be used for description on the reception side later. Each of windows A,B,C,. . is not limited to one bit, but may be plural bits.

2-2) Transmission Circuit

Figure 2:
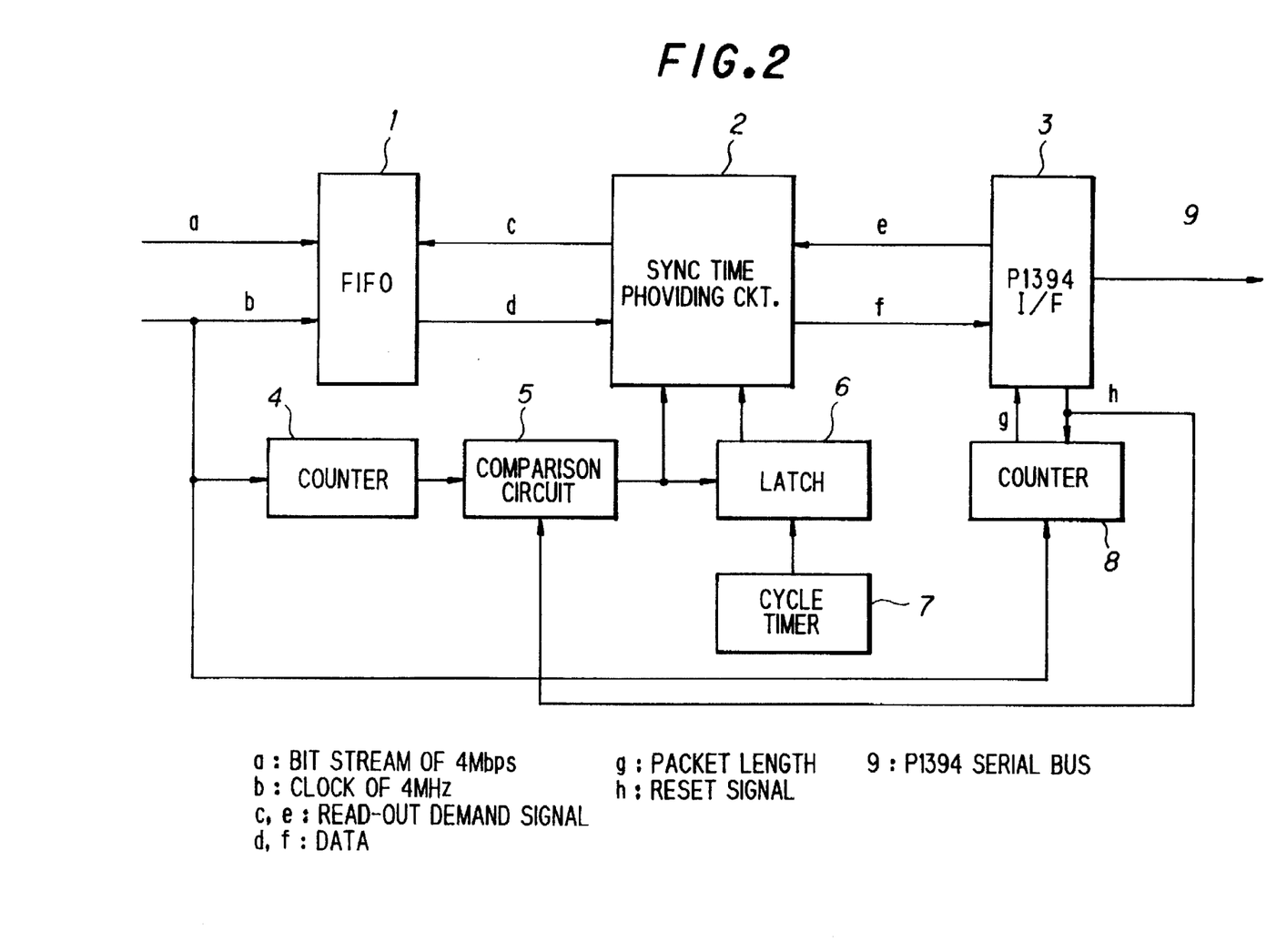
FIG. 2 is a block diagram showing a transmission circuit of the first embodiment according to the present invention.

Next, a transmission circuit will be described with reference to FIG. 2. An input bit stream a is written into a FIFO 1 in synchronism with a clock b of 4 MHz. On the other hand, a P1394 interface (hereinafter referred to as "P1394 I/F") 3 outputs a read-out request signal e to a sync time providing circuit 2 to indicate to the sync time providing circuit 2 to read out data from the FIFO 1.

The sync time providing circuit 2 judges whether a sync time should be written into a packet to be output. If the sync time is judged to be written, the sync time is output as data f to the P1394 I/F 3. Thereafter, a read-out request signal c is output to the FIFO 1 in response to the read-out request signal e to read out data d from the FIFO 1 and deliver the data d to the P1394 I/F 3.

The judgement as to whether the sync time should be provided is performed as follows. The output value of a counter 4, which counts up by the clock b, is output to the comparison circuit 5. The comparison circuit 5 outputs its output signal to the sync time providing circuit 2 and a latch 6 when the output value of the counter 4 is equal to zero. With this operation, it is possible that the sync time providing circuit 2 can judge whether a sync time should be written into a packet which is about to be output.

In this case, a value which is written as the sync time is an output value of the latch 6. The latch 6 latches the value of the cycle timer 7 at the time when the comparison circuit 5 outputs, and outputs it to the sync time providing circuit 2.

The packet length g which is output from a counter 8 corresponds to the length of a bit stream which was written at a previous period. This value is supplied to the P1394 I/F 3. In an actual circuit, the length of the bit stream which is written during one period of 125 μs is not necessarily constant due to jitter between the write-in timing and the clock, etc. as shown in FIG. 1. Accordingly, the packet length is supplied to the P1394 I/F 3 every period. The P1394 I/F 3 outputs a reset signal H at the head of the period of 125 μs. The comparison circuit 5 and the counter 8 are reset with the reset signal h, and are on standby for operation at a next period.

2-3) Timing of Reception Side

Figure 3:
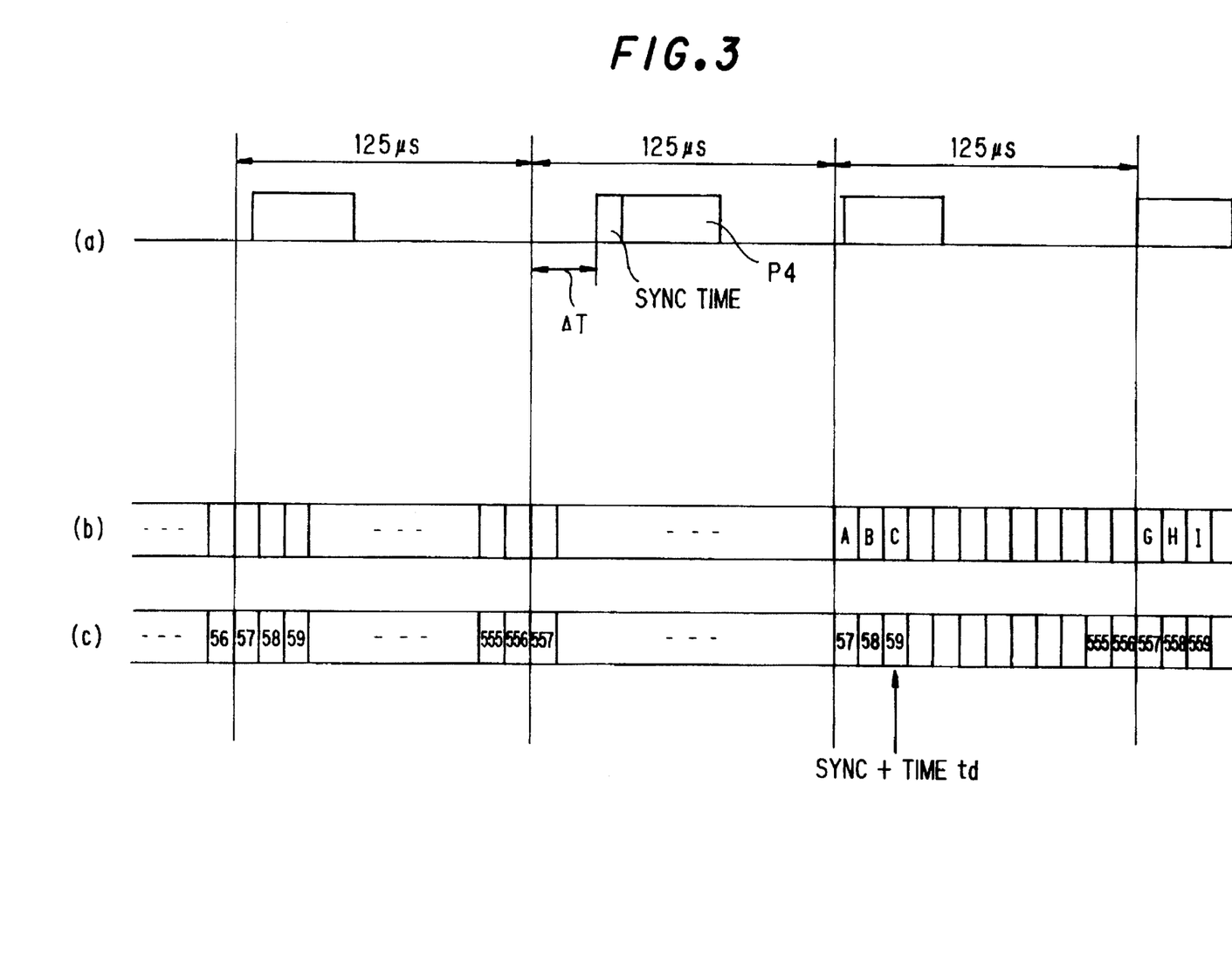
FIG. 3 is a timing chart for signals at a reception side in the first embodiment of the present invention.
Figure 4:
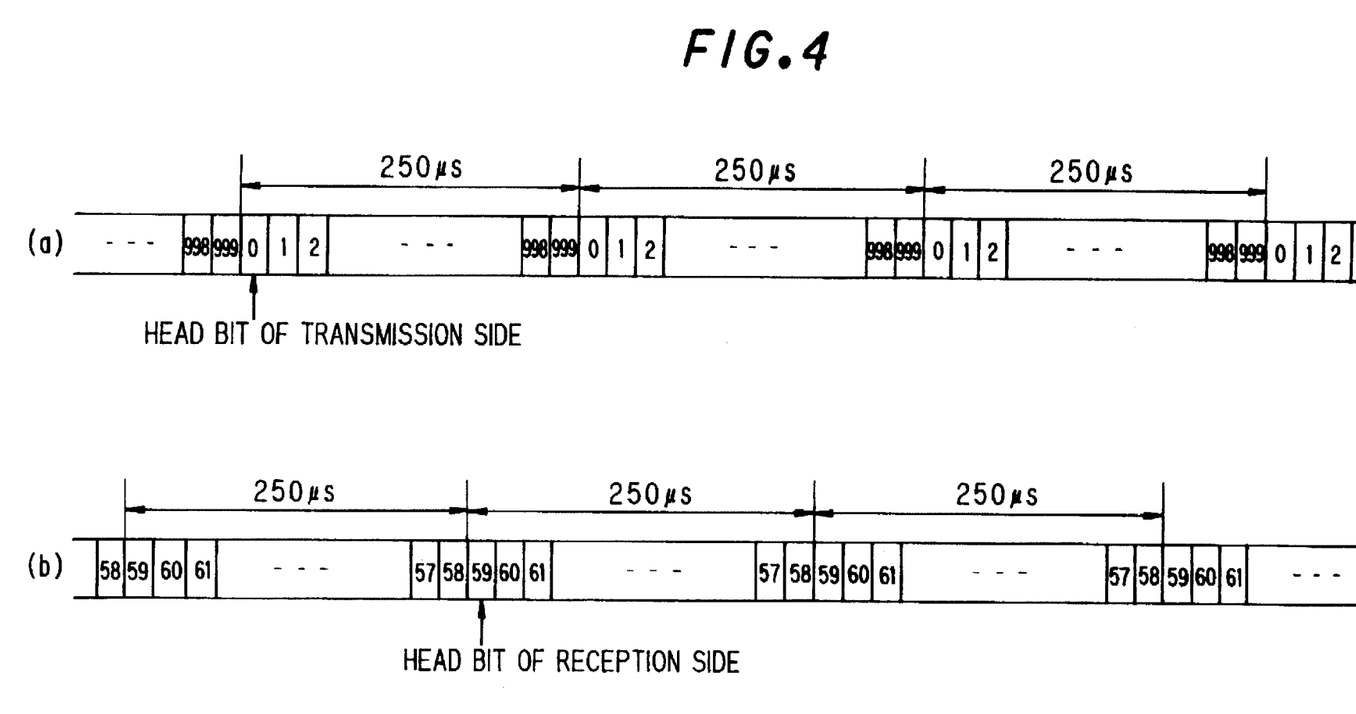
FIG. 4 is a diagram showing the relationship between the head bits and the period at the transmission and reception sides in the first embodiment.

Next, the timing of the reception side will be described with reference to FIG. 3. In FIG. 3, (a) represents a received packet, (b) represents a bit stream which is generated on the basis of the received packet, and (c) represents the output value of the counter for the counting clock of 4 MHz.

A packet which is received through the P1394 serial bus is read out as a bit stream through a FIFO as described later. Like the transmission side, the reception side has a counter which operates in synchronism with the bit stream. The counter of the reception side operates independently of the counter of the transmission side, so that it has a value different from that of the counter of the transmission side even at the same time. As described above, the clock of the transmission side and the clock of the reception side work independently of each other, so that there occurs a time lag (deviation) between these clocks. The bit rate of the transmission side and the bit rate of the reception side must be equal to each other on average, and thus this time lag is corrected using the sync time.

A method of correcting the time lag using the sync time will be described below.

When a packet having a sync-time written packet (for example, a packet P4 of FIG. 3) is received, the sync time is read out from the packet, and a time obtained by adding the sync time with a predetermined delay time td is set as the head bit of the bit stream at the reception side. The reason why the delay time td is added is as follows. The time of the sync time written in the packet is the time at the transmission side, and thus it has already passed over the sync time due to a factor such as jitter ΔT of the packet or the like at the time when the packet is received at the reception side, and the data written in the packet is read out as the bit stream. The occurrence of jitter is inherent to the P1394 serial bus.

Subsequently, the output value of the counter at the sum time of the sync time and the delay time td is latched. In an example of (c) of FIG. 3, it is equal to 59. When a sync-time written packet is afterwards received again, the same processing is performed to latch the output value of the counter, and then the difference between the previously-latched counter value and the currently-latched counter value is calculated. Like the transmission side, the counter of the reception side cycles when counting the clock of 4 MHz at 1000 times. Accordingly, if the bit rate of the transmission side is equal to the bit rate of the reception side, the two latched values would be equal to each other, so that the difference between these counter values is equal to zero. If the difference is not equal to zero, the difference is output to a PLL (the details of which will be described later) which prepares the read-out clock at the reception side to adjust the bit rate of the reception side. With this operation, the bit rates of the transmission and reception sides can be equal to each other on average.

In the example of FIG. 1, a point A of the bit stream corresponds to the head bit at the transmission side. However, the head bit does not necessary correspond to the point A at the reception side (in the example of FIG. 3, it corresponds to a point C). Accordingly, the phase between the periods of the transmission side and the reception side ordinarily deviates from each other. However, there would be no problem if the bit rates of the transmission and reception sides are equal to each other on average, and thus the deviation in phase induces no problem.

2-4) Reception Circuit

Figure 5:
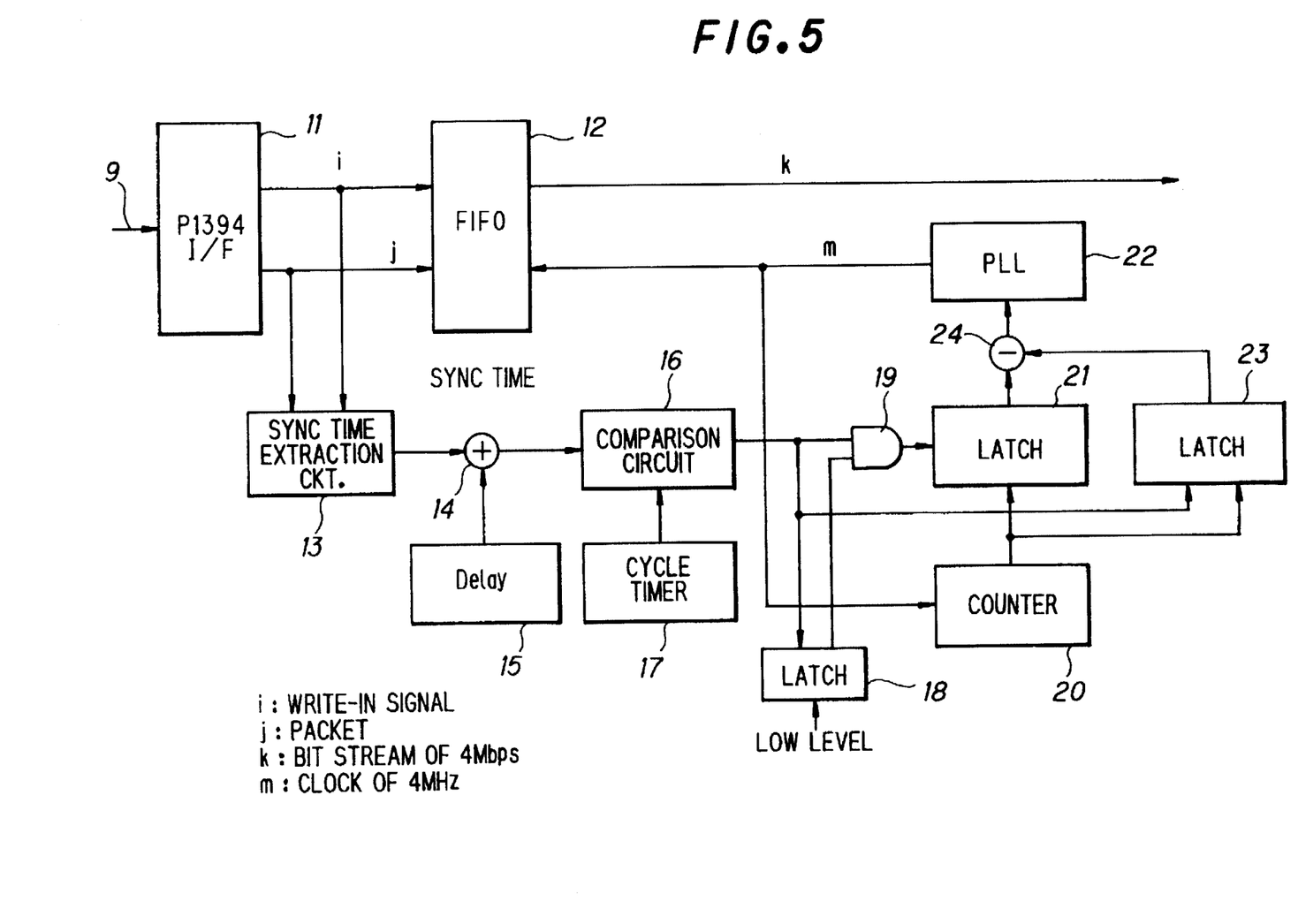
FIG. 5 is a block diagram showing a reception circuit in the first embodiment of the present invention.

Next, the reception circuit will be described with reference to FIG. 5. A packet j which is received through the P1394 serial bus 9 by the P1394 I/F 11 is output to a FIFO 12, and read out as a bit stream k of 4 MHz in synchronism with a clock m of 4 MHz which is output from an PLL 22.

In addition, the packet j which is output from the P1394 I/F 11 is also output to a sync time extraction circuit 13 to extract the sync time. In an adder 14, the sync time is added with the delay time td which is set in the register 15, and the addition result is compared with the output of a cycle timer 17 in a comparison circuit 16. If these values are equal to each other, the comparison circuit 16 outputs a signal.

With respect to the value of the cycle timer, both the transmission time and the reception time have the same absolute time. This is because the absolute time of the cycle timer provided to the cycle master is written in the cycle start packet which the cycle master transmits to the bus every 125 μs, and each piece of equipment which is connected to the bus receives the cycle start packet to correct the time of its cycle timer on the basis of the absolute time written in the received cycle start packet.

The output of the comparison circuit 16 is output to an AND circuit 19 and latches 18 and 23. The latch 23 latches the output of the counter 20 on the basis of the output of the comparison circuit 16. The counter 20 increments its count value one by one in response to the read-out clock m of the bit stream, and its period is equal to that of the transmission side, that is, 1000.

After a power source is switched on, the latch 21 performs a latch operation only once. A value which is latched by the latch 21 is set as the head bit of the reception side. Thereafter, in order to prevent this value from being altered, only one latch operation is permitted. This latch operation is performed by the latch 18. The latch 18 latches the low level on the basis of the first output of the comparison circuit 16 after the power source is switched on, and thus subsequently it continues to output the low-level to the AND circuit 19. Therefore, the latch 21 is supplied with the output of the comparison circuit 16 only once by the AND circuit 19, and thus the latch 21 performs the latch operation only once.

In a subtracter 24, the output of the latch 23 is subtracted from the output of the latch 21, and the subtraction result is output to the PLL 22. If the output of the subtracter 24 is larger than zero, it means that a value smaller than the position of the previous head bit is latched. In this case, the PLL 22 is supplied with such a value so that the phase is advanced. Conversely, if the output of the subtracter 24 is smaller than zero, the PLL is supplied with such a value that the phase is delayed. As a result, the bit rate of the reception side can be matched with that of the transmission side.

3) Second Embodiment

Next, a second embodiment according to the present invention will be described with reference to FIGS. 6 to 9. The parts corresponding to those of the first embodiment are represented by the same reference numerals.

3-1) Timing of Transmission side

Figure 6:
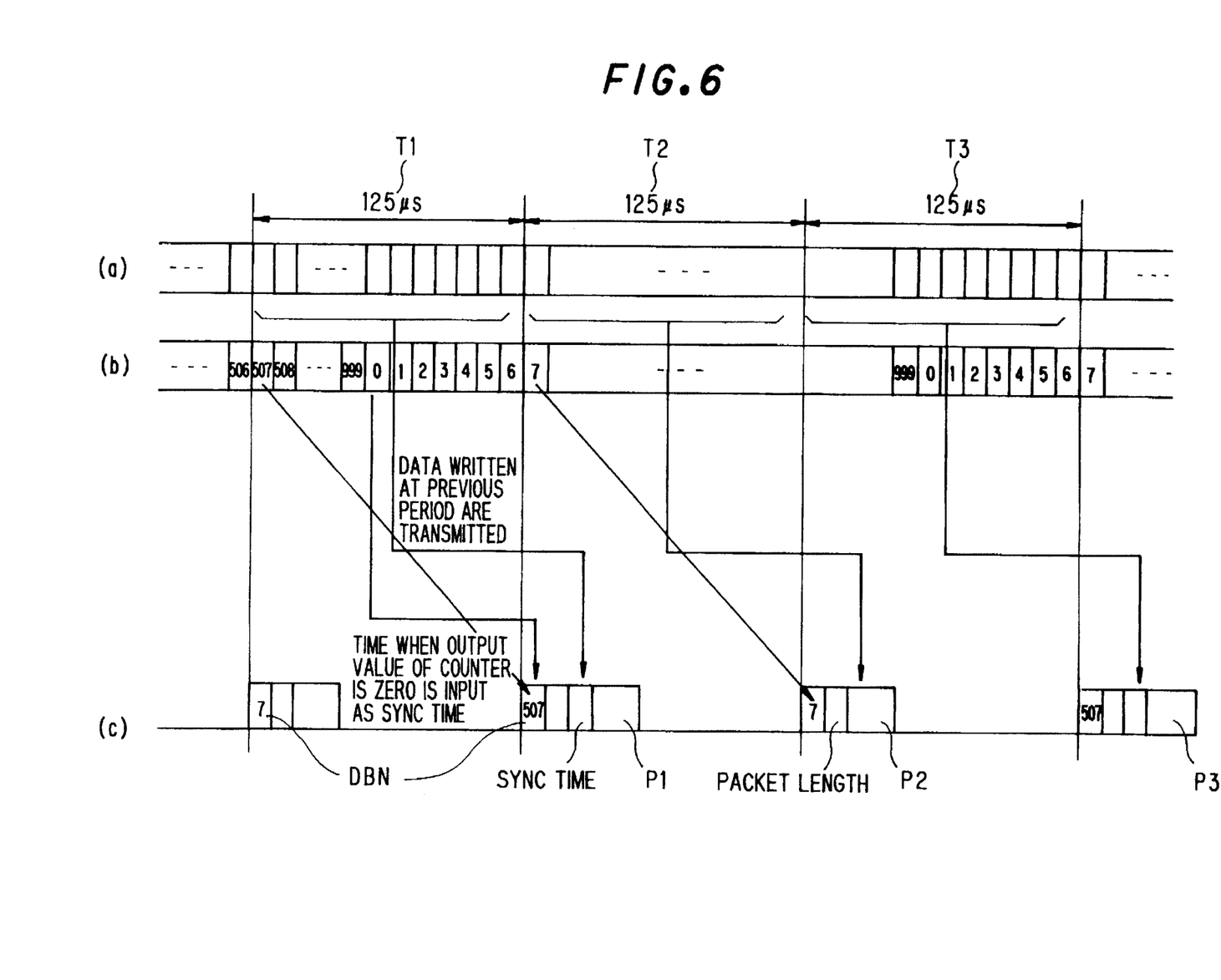
FIG. 6 is a timing chart for signals at the transmission side in a second embodiment of the present invention.

First, the timing of the transmission side will be described with reference to FIG. 6. In FIG. 6, (a) represents an input bit stream, (b) represents the output value of a counter for counting clocks of 4 MHz, and (c) represents a packet to be transmitted.

The difference between the second embodiment and the first embodiment is that all packets are added with the packet length and data block numbers (Data Block Number: hereinafter referred to as "DBN"). As described in the first embodiment, the packet length is the length of the bit stream written in the FIFO during the previous period, and the DBN is the output value of the counter for a bit which is written at the head of each packet.

In this embodiment, the head bit of the frame is read out from the FIFO at the reception side at the sum time of the sync time and the delay time td, wherein the sync time represents the time of the head bit of a frame, and whereby it is used to control the phase between the bit stream input to the transmission side and the bit stream output from the reception side.

3-2) Transmission Circuit

Figure 7:
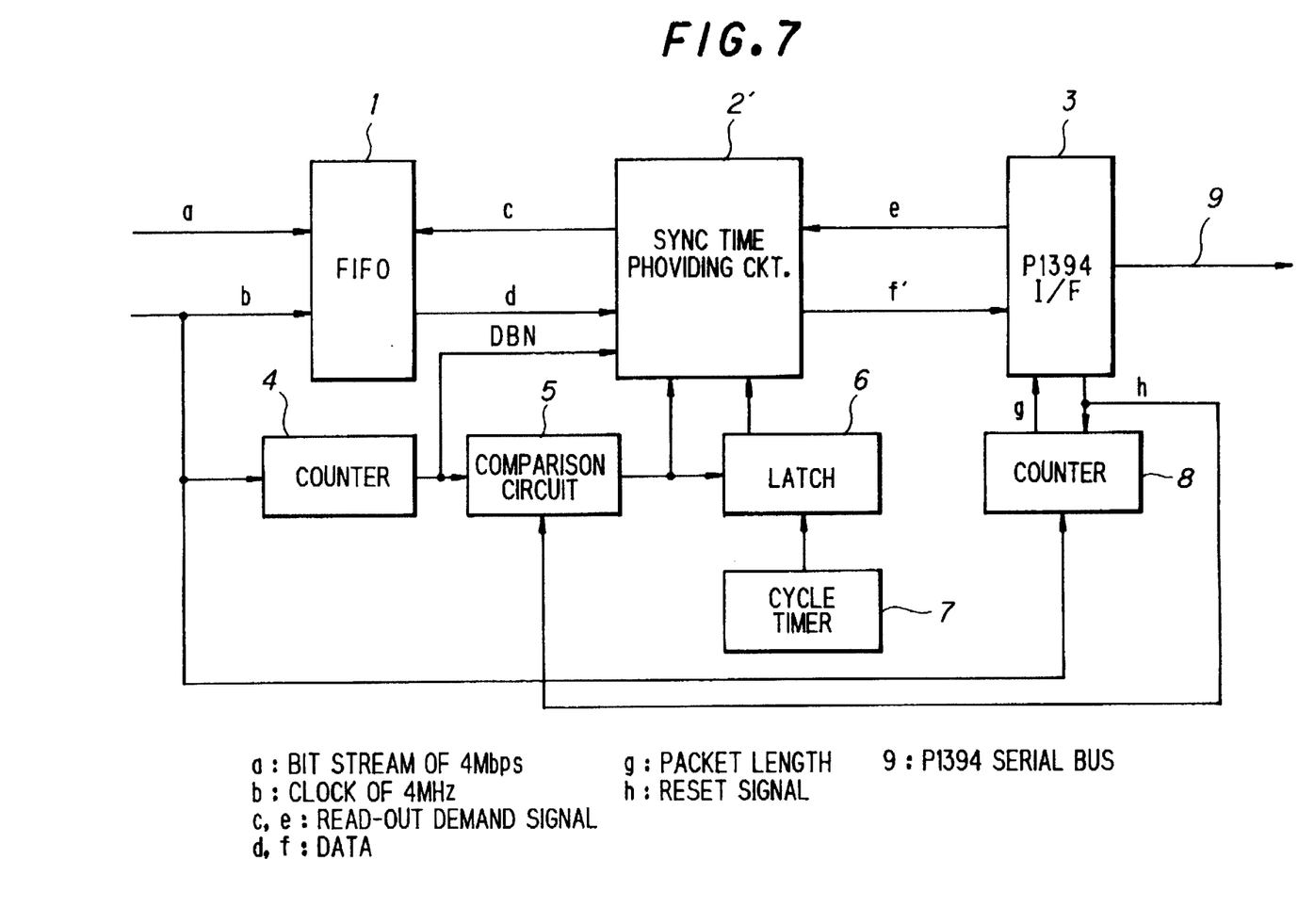
FIG. 7 is a block diagram showing a transmission circuit of the second embodiment according to the present invention.

Next, the transmission circuit will be described with reference to FIG. 7. The input bit stream a is written into the FIFO in synchronism with the clock b of 4 MHz. Furthermore, the P1394 I/F 3 outputs the read-out request signal e to a sync time, DBN providing circuit 2' to instruct the circuit to read out data from the FIFO 1.

The sync time, DBN providing circuit 2' judges whether a sync time should be written into a packet which is about to be output. If the sync time is judged to be written into the packet, the sync time and DBN input from the counter 4 are output as data f to the P1394 I/F 3. Thereafter, the sync time, DBN providing circuit 2' outputs the read-out request signal c to the FIFO 1 in response to the read-out request signal e to read out data from the FIFO 1, and delivers the data f to the P1394 I/F 3. If no sync time is judged to be written, only DBN is delivered to the P1394 I/F 3.

The criterion of the judgment as to whether the sync time is provided and the value which is written as the sync time are identical to those of the first embodiment. Furthermore, the packet length g output from the counter 8 and the action of the reset signal h output from the P1394 I/F 3 are identical to those of the first embodiment.

3-3) Timing of Reception side

Figure 8:
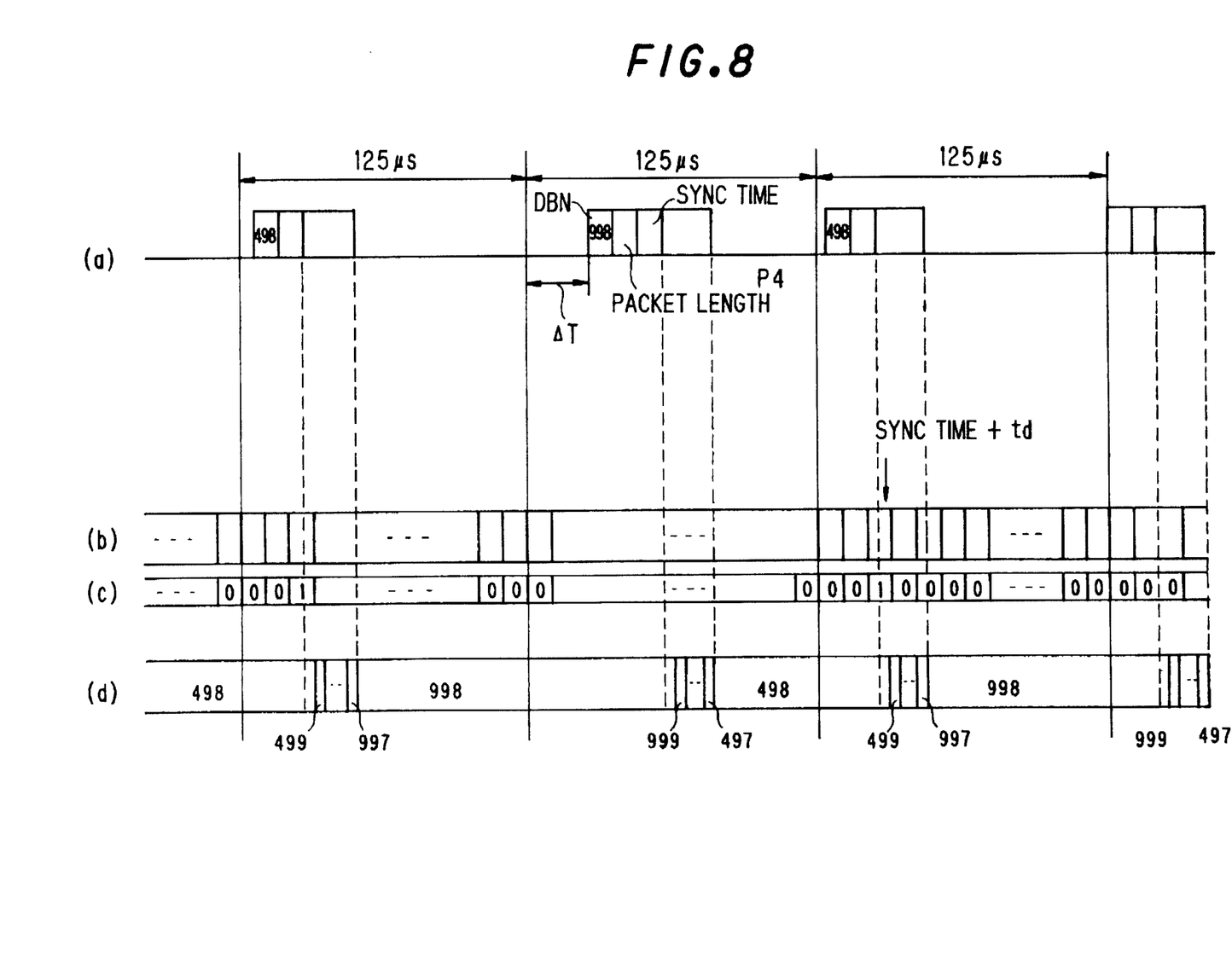
FIG. 8 is a timing chart for signals at the reception side of the second embodiment according to the present invention.

Next, the timing of the reception side will be described with reference to FIG. 8. In FIG. 8, (a) represents a received packet, (b) represents a bit stream which is generated on the basis of the received packet, (c) represents a framing bit, and (d) represents the output value of the counter for counting the clock of 4 MHz.

A packet which is received through the P1394 serial bus is read out as a bit stream from FIFO as described later. As described in the first embodiment, the clock of the transmission side and the clock of the reception side operate independently of each other, so that there occurs a time lag therebetween. The bit rate of the transmission side and the bit rate of the reception side must be equal to each other on the average. Accordingly, a method of correcting the time lag with the sync time and controlling the phase between the bit streams of the transmission side and the reception side will be described.

When the packet P4 is received, the data portion is written in the FIFO, and DBN and the sync time are extracted. The reception side is provided with a counter which counts up every time the data of the packet are read out, and (d) of FIG. 8 represents the output value of the counter. The output value of the counter is set to DBN every time it receives DBN. Since DBN=99 is written in the packet P4 of FIG. 8, the output value of the counter is automatically set to 998. Accordingly, if the counter operates normally, the output value of the counter would be set to 998 at the time when it receives DBN.

When the output value of the counter whose value is corrected with DBN is equal to zero, the framing bit is set to 1 and written into the FIFO, and the data which are written into the FIFO at the same time are represented as the head bit of the frame. Therefore, the FIFO has a data bus which is wider than the width of the data by 1 bit. The framing bit is also read out from the FIFO simultaneously with the bit stream. This situation is shown in (c) of FIG. 8. As described above, the data whose framing bit is equal to 1 corresponds to the head bit of the frame, and the PLL at the read-out side is adjusted so that the time when the data are read out corresponds to the time obtained by adding the sync time with the prescribed delay time td. With this operation, a fixed phase relationship can be kept between the transmission side and the reception side.

3-4) Reception Circuit

Figure 9:
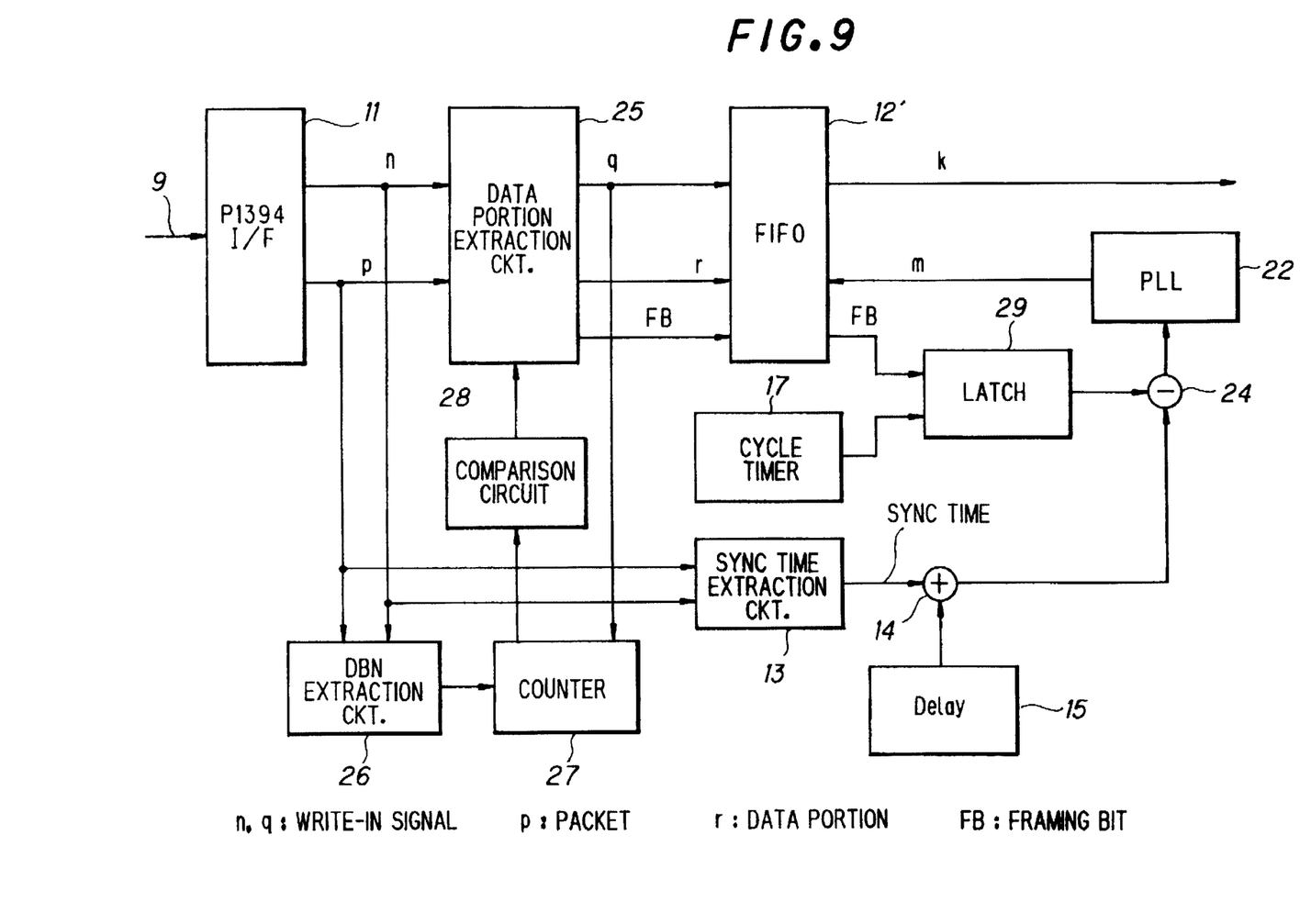
FIG. 9 is a block diagram showing a reception circuit of the second embodiment according to the present invention.

The reception circuit will be described with reference to FIG. 9. When receiving the packet, the P1394 I/F 11 outputs a write-in signal n and a packet p to a data portion extraction circuit 25, a DBN extraction circuit 26 and a sync time extraction circuit 13.

The DBN extraction circuit 26 reads out DBN from the packet p, and outputs it to a counter 27. The counter 27 counts up with a write-in signal q, and its output value is set to DBN at the time when the DBN is input from the DBN extraction circuit 26. The counter 27 outputs the counter value to a comparison circuit 28.

The comparison circuit 28 compares the output of the counter 27 with zero. If it is equal to zero, the comparison circuit 28 outputs a signal to the data portion extraction circuit 25. In the data portion extraction circuit 25, a data portion r is extracted from the packet p which is input from the P1394 I/F 11, and it is written into a FIFO 12' together with the write-in signal q. At this time, when a signal representing that the output value of the counter 27 is equal to zero is input from the comparison circuit 28, the framing bit to be written into the FIFO 12' is set to 1. With this operation, it is determined that the data whose framing bit in the FIFO 12' is equal to 1 corresponds to the head of the frame.

The sync time extraction circuit 13 extracts the sync time from the packet, and the sync time is added with the predetermined time td in an adder 14. The addition result is output to a subtracter 24. The framing bit which is written into the FIFO 12' together with the data is read out together with the data and output to a latch 29. In the latch 29, the value from the cycle timer 17 is latched at the time when the output from the FIFO 12' is equal to 1, and the latched value is output to the subtracter 24.

The subtracter 24 subtracts the time input from the adder 14 from the time input from the latch 29, and outputs the subtraction result to the PLL 22. When a positive value is input to the PLL 22, the PLL 22 moves the clock m in an advance direction (in a frequency-increase direction) in accordance with the magnitude of the value. On the other hand, when a negative value is input to the PLL 22, the PLL 22 moves the clock m in a delay direction (in a frequency-lowering direction) in accordance with the magnitude of the value. With this operation, a fixed phase relationship can be kept between the bit stream input to the transmission side and the bit stream read out from the reception side.

Furthermore, in this embodiment, the amount of data lost from the packets can be calculated using the packet length. For example, in the case of FIG. 8, the DBN of a packet just before the packet P4 is equal to 498, and its packet length is equal to 500. Therefore, if normally operating, the value obtained by adding the DBN with the packet length is equal to the DBN of packet P4. However, if packet P4 suffers a loss, the DBN which is extracted by the DBN extraction circuit 26 is equal to 498 which is then provided to the next packet to be received, so that it can then be determined that 500 bits are lost.

Still furthermore, in this embodiment, the loss of the packet can be detected by detecting the fact that the output value of the counter 27 at the time when the reception side receives DBN is different from the DBN. For example, in the case of FIG. 8, if the packet P4 suffers a loss, the DBN which is extracted by the DBN extraction circuit 26 is equal to 498 which is then provided to the next packet to be received. On the other hand, the output value of the counter 27 is set to 998.

What is claimed is:

1. A packet transmission method for transmitting a bit stream of a prescribed rate while also packeting the bit stream, comprising the steps of:

periodically determining a position of a head bit of a frame of the bit stream at a transmission side;

packeting the bit stream, said step of packeting the bit stream including detecting whether data comprising the bit stream to be packeted includes a head bit of the bit stream and adding to a packet including a head bit of the bit stream data indicative of a time corresponding to the determined position of the head bit of the bit stream;

temporarily storing each of a received packet generated by said packeting step at a reception side;

extracting from each received packet including data indicative of a time corresponding to the determined position of the head bit of the bit stream a time of the position of the head bit of the bit stream; and controlling a read-out rate of the bit stream included within each temporarily stored received packet with the extracted time.

2. The packet transmission method as claimed in claim 1, further comprising the step of fixing the position of the bit stream at the sum of the extracted time of the position of the head bit of the bit stream and a predetermined value, and controlling the read-out rate of the reception side on the basis of the position of the head bit of the bit stream.

3. The packet transmission method as claimed in claim 1, further comprising the steps of adding the packet length to the packet at the transmission side, and calculating the data loss amount during a transmission operation using the packet length and the position of the bit of the bit stream at the reception side.

4. The packet transmission method as claimed in claim 1, further comprising the step of matching a time of transmission of the packeted bit stream and a time of reception of the packeted bit stream.

5. A packet transmission method for transmitting a bit stream of a prescribed rate while also packeting the bit stream, comprising the steps of:

periodically determining a position of a head bit of a frame of the bit stream at a transmission side;

packeting the bit stream, said step of packeting the bit stream including detecting whether data comprising the bit stream to be packeted includes a head bit of the bit stream and adding to a packet including a head bit of the bit stream data indicative of a time corresponding to the determined position of the head bit of the bit stream;

temporarily storing each of a received packet generated by said packeting step at a reception side;

extracting from each received packet including data indicative of a time corresponding to the determined position of the head bit of the bit stream a time of the position of the head bit of the bit stream; and controlling a read-out rate of the bit stream included within each temporarily stored received packet with the extracted time;

wherein said step of determining the position of the head bit of the bit stream comprises a step of operating a counter at the same rate as the bit stream.

6. A communication system having a plurality of pieces of equipment and a packet transmission system for transmitting a bit stream of a prescribed rate while also packeting the bit stream, comprising:

means for periodically determining a position of a head bit of a frame of the bit stream at a transmission side;

means for packeting the bit stream, said means for packeting the bit steam including means for detecting whether data comprising the bit stream to be packeted includes a head bit of the bit stream and an adder for adding to a packet including a head bit of the bit stream data indicative of a time corresponding to the determined position of the head bit of the bit stream;

a temporary storage memory for temporarily storing at a reception side each of a received packet generated by the means for packeting;

extraction means for extracting from each received packet including data indicative of a time corresponding to the determined position of the head bit of the bit stream a time of the position of the head bit of the bit stream; and a controller circuit for controlling a read-out rate of the bit stream included within each temporarily stored received packet in response to the extracted time.

7. The packet transmission system as claimed in claim 6, wherein the transmission side is provided with means for adding a position of a bit of the bit stream to a packet every predetermined time the packet is produced by the means for packeting the bit stream, and the reception side is provided with means for controlling the read-out rate of the bit stream included within each temporarily stored received packet on the basis of a difference in the time when the head bit of the bit stream at the reception side is read out from said temporary storage memory and the time of the position of the head bit of the bit stream which is extracted from the packet.

8. The packet transmission system as claimed in claim 7, wherein each piece of equipment at the transmission side and the reception side comprises a VTR.

9. The packet transmission system as claimed in claim 7, wherein at least one of the pieces of equipment at the transmission side comprises a video signal reproducing device and at least one of the pieces of equipment at the reception side comprises a computer.

10. The packet transmission system as claimed in claim 7, wherein at least one of the pieces of equipment of the transmission side comprises a video signal reproducing device and at least one of the pieces of equipment at the reception side comprises an editor.

* * * * *